(12) United States Patent
Noe

(10) Patent No.: US 9,604,603 B2
(45) Date of Patent: Mar. 28, 2017

(54) VEHICLE INTERIOR DETAILING TOOL

(71) Applicant: Raymond Noe, Palmer, AK (US)

(72) Inventor: Raymond Noe, Palmer, AK (US)

( * ) Notice: Subject to any disclaimer, the term of this patent is extended or adjusted under 35 U.S.C. 154(b) by 0 days.

(21) Appl. No.: 14/577,911

(22) Filed: Dec. 19, 2014

(65) Prior Publication Data

US 2016/0375877 A1   Dec. 29, 2016

(51) Int. Cl.
*A47L 13/16* (2006.01)
*A47L 13/38* (2006.01)
*B60S 3/00* (2006.01)

(52) U.S. Cl.
CPC ............. *B60S 3/008* (2013.01); *A47L 13/16* (2013.01); *A47L 13/38* (2013.01)

(58) Field of Classification Search
CPC .......... A47L 13/10; A47L 13/16; A47L 13/38; A47L 4/02; B60S 3/008
See application file for complete search history.

(56) References Cited

U.S. PATENT DOCUMENTS

| | | | | |
|---|---|---|---|---|
| 2,134,965 A | * | 11/1938 | Zbarsky | 15/220.3 |
| 2,172,479 A | * | 9/1939 | McMillen | 15/220.3 |
| 2,276,264 A | * | 3/1942 | Goldfinger | 15/220.3 |
| 2,490,892 A | * | 12/1949 | Westhoff | 15/394 |
| 2,856,625 A | * | 10/1958 | Delacretaz | 15/244.1 |
| 4,400,842 A | * | 8/1983 | Vitonis | 15/247 |
| 4,435,874 A | * | 3/1984 | Jacobson | 15/220.3 |
| 4,464,804 A | | 8/1984 | Hopkins | |
| 4,483,037 A | * | 11/1984 | Jacobson | 15/220.3 |
| 4,574,415 A | * | 3/1986 | Vitonis | 15/114 |
| 4,718,141 A | * | 1/1988 | Kuehnl | 15/394 |
| 4,787,118 A | * | 11/1988 | Weiland et al. | 15/394 |
| 4,879,782 A | * | 11/1989 | Jacobson | 15/220.3 |
| 5,203,048 A | | 4/1993 | Bynum | |
| 5,704,089 A | * | 1/1998 | Walters | 15/227 |
| 6,422,835 B1 | | 7/2002 | Beauchard | |
| 7,735,181 B1 | * | 6/2010 | Thomas | 15/220.3 |
| 8,083,860 B2 | | 12/2011 | Loftis | |
| 8,734,585 B1 | * | 5/2014 | Muncy | 134/6 |
| 2008/0028554 A1 | | 2/2008 | Chu | |

* cited by examiner

*Primary Examiner* — Randall Chin
(74) *Attorney, Agent, or Firm* — Global Intellectual Property Agency, LLC; Daniel Boudwin

(57) ABSTRACT

A vehicle interior detailing tool is provided. The device comprises a handheld assembly that is used to clean the slats of a vehicle climate control vent, whereby the tool is inserted into the vent and in between the slats thereover to clean the same. The tool comprises a handle end and a plurality of tines extending therefrom. The tines extend parallel therefrom and each supports an elongated cleaning sleeve thereon. The cleaning sleeves are used to contact the surfaces of the vent and physical remove dirt, dust, and foreign debris thereon. The sleeves are elastic members that conform to the separate of the slats and fit therebetween, bearing on the surfaces to physical clean the same. The sleeves can further support a cleaning solution.

8 Claims, 3 Drawing Sheets

VEHICLE INTERIOR DETAILING TOOL

BACKGROUND OF THE INVENTION

Field of the Invention

The present invention relates to cleaning tools and implements. More specifically, the present invention relates to an automotive detailing tool that is used to clean interior vents of a vehicle's climate control system while cleaning the vehicle.

Car detailing is a meticulous process that involves cleaning and restoring the cosmetic features of a vehicle. Professional detailers and enthusiasts employ various tools and treatments to improve the paint finish of a vehicle, to clean the interior surfaces, and to restore the condition of the same along the interior and exterior of the vehicle. Typical detailing tools include polishing machines, handheld brushes, and other cleaning implements. Common tools also include nonabrasive towels and treatment applicators. Common treatments include different waxes, polishes, tire treatments, and various solutions for treating the surfaces of the vehicle.

When detailing a vehicle, the interior of a vehicle is particularly difficult to clean. The interior surfaces tend to be more delicate and the configuration of the interior components makes for difficult regions to apply treatments or to physically clean by hand. Proper tools are therefore desired to adequately reach and clean the intricate surfaces of a vehicle interior. One area of particular interest is the climate control system and the air vents that allow forced air to be dispersed into the vehicle cabin. These vents can become layered with dust and dirt over time. To clean the vents, detailers often resort to cotton swabs to reach the vent slats to clean the same. The cotton swabs are inserted between the slats of the vent to physically remove dirt and debris, which is tedious and time consuming.

The process of using individual cotton swabs on each vent slat is labor intensive and should be subject of improvement. For professional detailers, a more effective tool is desired that reduces time spent on the task, improves efficiency, and improves the end result. To fulfill this need, presented herein is an automotive detailing tool that is particularly suited to the task. The present invention comprises a handheld too that includes sleeved tines, whereby the tines are inserted into a vent and in between the slats thereof. The sleeves contact the slats and are used to remove dirt and dust therefrom. The tool is held by the handle end, and the sleeves contact multiple surfaces at once. The tool therefore reduces cleaning time and improves efficiency, and furthermore eliminates the need for cotton swabs for the task.

Description of the Prior Art

Devices have been disclosed in the prior art that relate to cleaning tools. These include devices that have been patented and published in patent application publications. These devices generally relate to various brushes, cleaning appliances and kits that are used to clean different surfaces. The following is a list of devices deemed most relevant to the present disclosure, which are herein described for the purposes of highlighting and differentiating the unique aspects of the present invention, and further highlighting the drawbacks existing in the prior art.

One such device in the art is U.S. Patent Publication No. 2008/0028554 to Chu, which discloses a cleaning tool for detailing the interior of a vehicle in which the tool comprises a tool handle and an affixable cleaning element thereto. Various cleaning elements are disclosed by Chu, including brush tools, bristle tools, wedge tools, and others. While providing a useful tool and kit of tool implements that can be supported by a common tool handle, the Chu devices fails to disclose a vehicle climate control vent cleaner. The present invention provides a convenient and specific cleaning implement that is configured to insert between slats of a vent and contact the surfaces thereof for dirt and dust removal.

Another device U.S. Pat. No. 8,083,860 to Loftis, which discloses a cleaning brush for removing dust and other debris from surfaces, in which the device includes a handle and a working end supporting an array of bristles. The handle can support a vacuum suction hose, which draws a vacuum through the handle for dirt to be drawn through holes in the working end thereof. The bristles are aligned in rows for specific cleaning steps when dusting or removing debris on a surface. Similar to Chu, while the Loftis device discloses a cleaning implement, it fails to contemplate the construction or operation of the present invention. The Loftis device is a useful assembly that functions on various surfaces. The present invention is a specific tool for cleaning vehicle interior climate control vents.

U.S. Pat. No. 5,203,048 to Bynum discloses a golf club cleaning brush that includes a brush side and a non-brush side. The brush side includes outwardly extending bristles for cleaning the clubface of a golf club. Finger protrusions are provided along the non-brush side. The Bynum device, while providing a tool for cleaning having a handle end and a bristle end, similarly fails to disclose a working end with cleaning sleeves that are arranged such that they can be inserted into a vehicle climate control vent.

The present invention provides a cleaning implement that is particularly suited for cleaning the vents of a vehicle climate control system. The device is a small, handheld appliance that can extend into the vents of a vehicle interior and clean the surface thereof. It is submitted that the present invention substantially diverges in design elements from the prior art, and consequently it is clear that there is a need in the art for an improved automotive detailing tool. In this regard the instant invention substantially fulfills these needs.

SUMMARY OF THE INVENTION

In view of the foregoing disadvantages inherent in the known types of automotive detailing tools now present in the prior art, the present invention provides a new detailing tool that can be utilized for cleaning the interior surfaces of a climate control vent and the slat surfaces thereof.

It is therefore an object of the present invention to provide a new and improved automotive detailing tool that has all of the advantages of the prior art and none of the disadvantages.

It is another object of the present invention to provide an automotive detailing tool that is particularly useful for cleaning the surfaces of a climate control vent within a vehicle interior, whereby the tool replaces traditional cotton swab tools for the task.

Another object of the present invention is to provide an automotive detailing tool that is small, handheld, and can be inserted into the climate control vent in a vehicle cabin.

Yet another object of the present invention is to provide an automotive detailing tool that includes a handle and a plurality of elastic sleeves that are disposed on elongated tines, whereby the sleeves contact the surfaces of the climate control vent to physical remove dust, dirt, and debris therefrom.

Another object of the present invention is to provide an automotive detailing tool that includes replaceable cleaning sleeves that can be used for cleaning and then replaced when soiled or saturated with dirt.

Another object of the present invention is to provide an automotive detailing tool that can accommodate the vents of various automobile makes and models, whereby the sleeves conform to the gap between vent slats as the tines are inserted therebetween.

Another object of the present invention is to provide an automotive detailing tool that provides a useful tool that is inexpensive to purchase, whereby the tool is readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
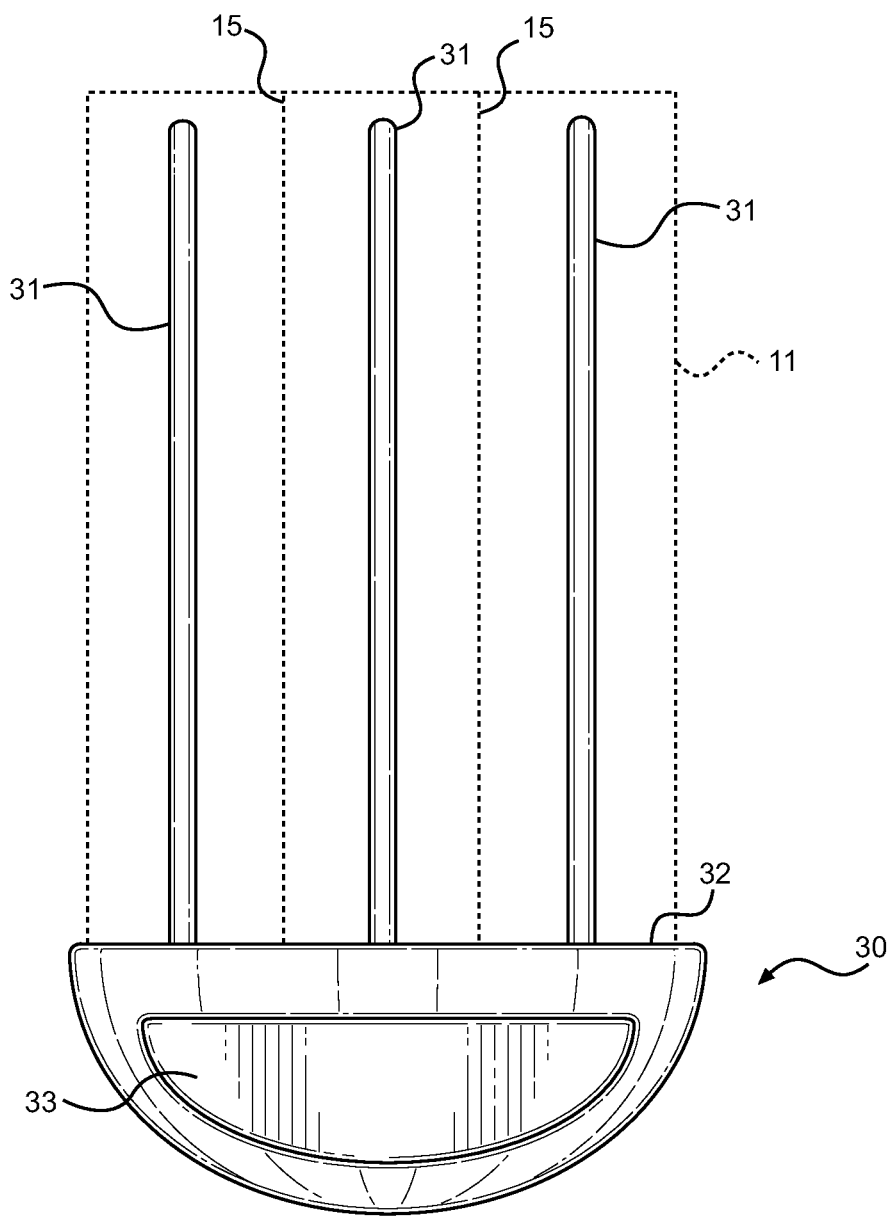
FIG. 1 shows a frontal view of the detailing tool of the present invention.

Reference is made herein to the attached drawings. Like reference numerals are used throughout the drawings to depict like or similar elements of the detailing tool of the present invention. For the purposes of presenting a brief and clear description of the present invention, the preferred embodiment will be discussed as used for cleaning the surfaces of a climate control vent in an automobile interior. The figures are intended for representative purposes only and should not be considered to be limiting in any respect.

Referring now to FIG. 1, there is shown a side view of the detailing tool of the present invention. The tool is one that allows users to quickly clean the surfaces of a climate control vent within the interior of a vehicle. Traditionally this is process is done with a cotton swab, which can be finicky and time consuming. The present invention contemplates a tool that can be inserted into a vent to clean multiple surfaces at once, whereby a larger surface area is cleaned than is possible with a cotton swab, simply by inserting the tool into the vent and moving it from side to side to clean its surfaces.

The tool is a handheld device comprising a tool handle portion 30 that supports a plurality of tines 31 extending therefrom. The handle portion 30 includes a gripping area 33 and a flat base 32. From the flat base, the tines 31 extend outward and in parallel configuration. The tines 31 are preferably orthogonally extending from the substantially planar base 32, and are utilized to support an elongated cleaning sleeve 11 thereover. The handle portion 30 may comprise a specific design, including a rounded profile, a square profile, a handle portion with a thickness and depressed gripping area, or similar as desired by the manufacturer and end user.

Figure 2:
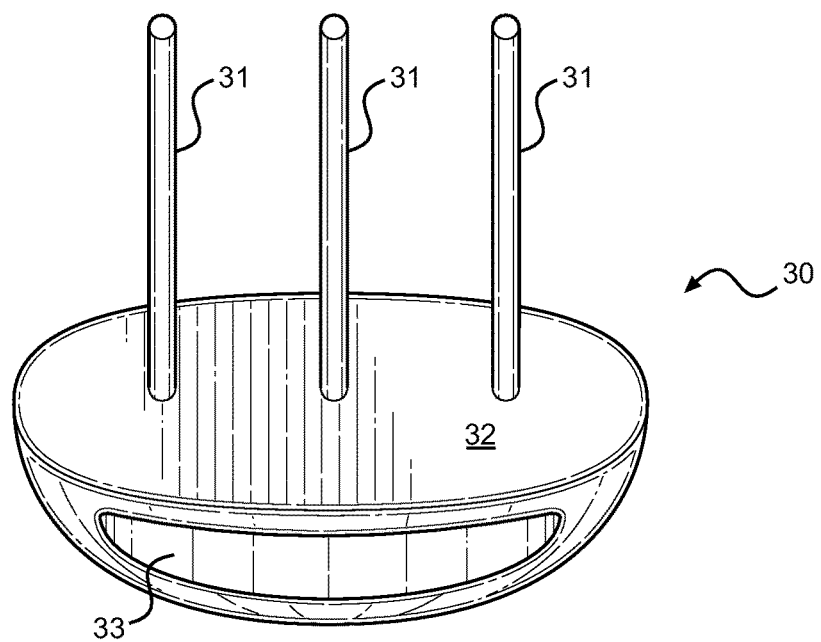
FIG. 2 shows a perspective view of the detailing tool of the present invention.

As seen in FIGS. 1 and 2, the tines are elongated, cylindrical members having a distal end and a proximal end, the proximal end connected to the handle base 32. The tines 31 have a diameter and are spaced apart from one another such that the tines 31 can easily be positioned in between two or more climate control vent slats. In this way, handle portion 30 is gripped and the tines 31 are inserted into the gaps between the climate control vent slats, whereby the cleaning sleeves 11 are used to contact the slats for removal of dust, dirt, and other debris that may have collected thereon. The handle portion 30 is gripped between the user's thumb and forefinger, whereby the user pinches the gripping portions 33 disposed along the sides of the handle portion 30 as the tool is inserted into the climate control vent.

Figure 3:
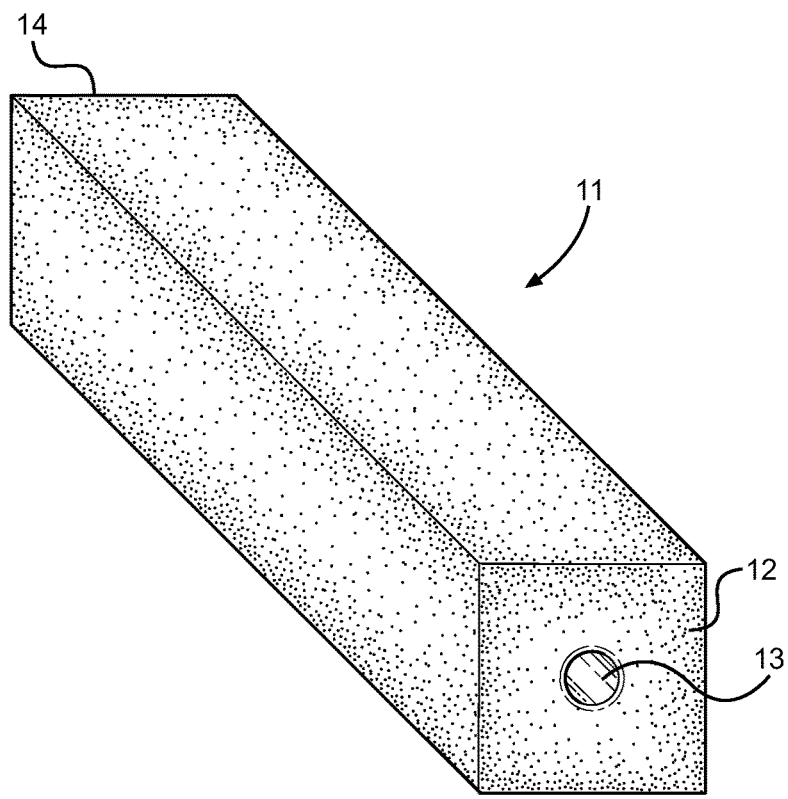
FIG. 3 shows an example of the replaceable cleaning sleeve of the present invention.

Referring now to FIG. 3, there is shown a view of the cleaning sleeve 11 of the present invention, which is placed over an individual tine and used to contact the surfaces of the vent to clean the same. The sleeves 11 are elongated, square or cylindrical bodies composed of a compressible, soft material that is suitable for cleaning delicate surfaces without scratching the same. The sleeves 11 may comprise a cotton or microfiber outer surface, and foam or cotton interior, however the exact configuration of the sleeves may differ depending on manufacture. The sleeves are compressible and include an exterior surface that is suitable for cleaning a surface of dust and dirt. The outer surface may support a cleaning solution spray thereon, such as a hand towel supports cleaning solutions when cleaning the free field surfaces of the vehicle interior and exterior.

The sleeve 11 comprises a cylindrical or square construction having a length, a diameter, a proximal end 12, and a distal end 14. The proximal end 12 includes an opening 13 concentric with the body of the sleeve 11. The opening 13 provides access for an individual tine to be inserted into the open interior of the sleeve 11. The sleeve 11 therefore has a tubular construction with an open interior channel sized to receive a single tine and the diameter and length thereof. The diameter of the sleeve 11 is such that the sleeves 11 are in contact, or near contacting each other, when the sleeves 11 are positioned over adjacent tines. In this way, the adjacent sleeves 11 contact both sides of a single slat when inserted into the vent. This configuration is not considered limiting, but one embodiment of the tool exemplified in FIG. 4.

Figure 4:
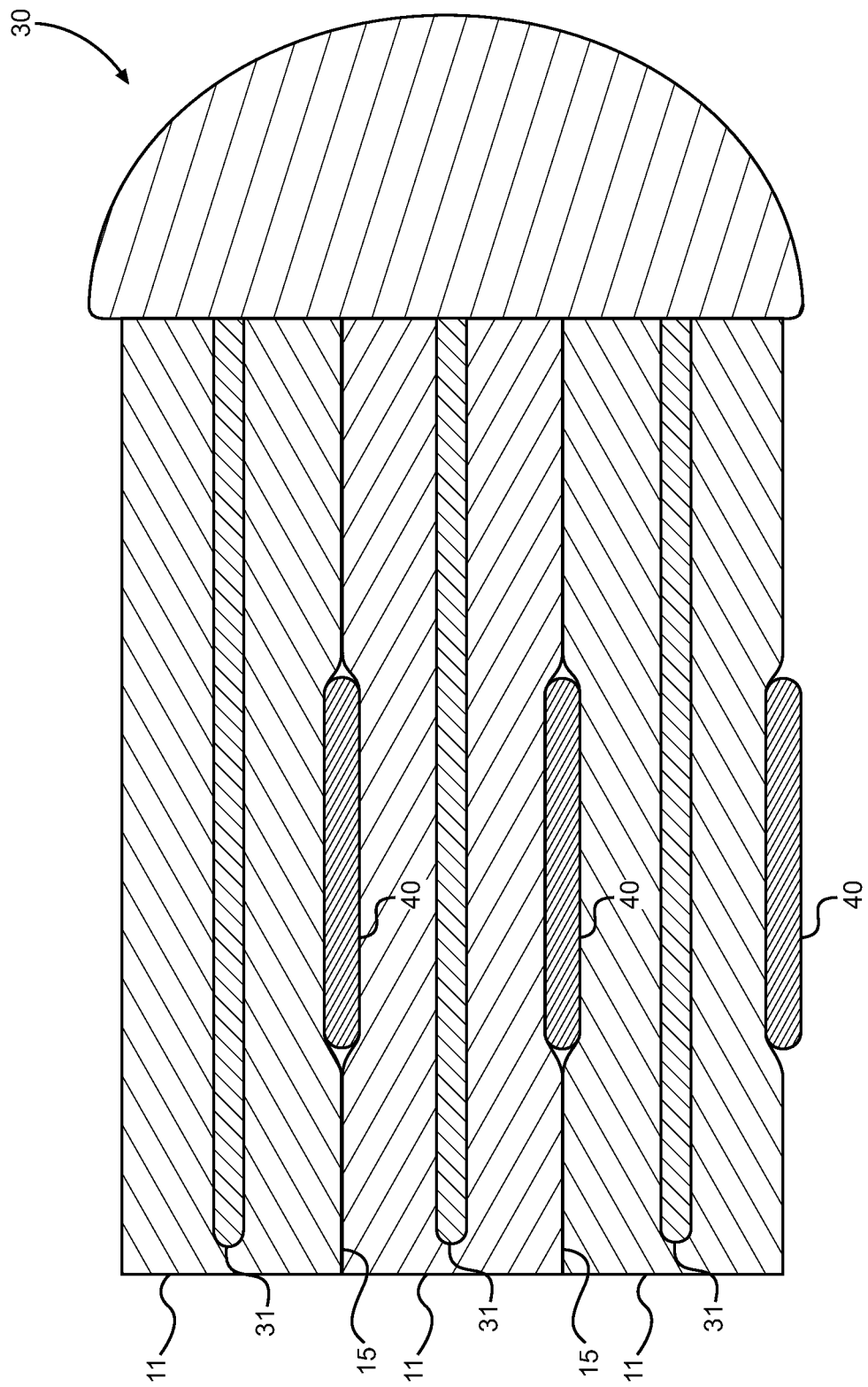
FIG. 4 shows a cross section view of the tool in a working state, whereby the sleeves are contacting the vent slats as the tines are placed therebetween.

Referring specifically to FIG. 4, there is shown cross section view of the detailing tool in a working state. As shown, the tool supports a plurality of sleeves 11 in a parallel arrangement such that the lengths of the sleeves 11 are aligned and extend orthogonally from the handle portion 30. The sleeves 11 are each supported by an individual tine 31, which is connected to the base and inserted through the interior channel of the tubular sleeves 11. As shown the sleeves 11 may be sized such that their diameters, when affixed to adjacent tines 31, contact each other along a line of contact 15 midway between the tines 31. The adjacent tines 31 are therefore separated by a distance from one another and the diameter of each cleaning sleeve is equal to at least half the distance between each tine. This promotes contact with both sides of the vent slats 40, which are generally spaced equally and include an upper and lower surface.

In operation, the sleeves 11 are placed on the tines 31 of the tool prior to use. The sleeves 11 can be sprayed with a cleaning solution or surface treatment 12 prior to use, or they can be dry. The user grips the handle portion 30 and inserts the tines 31 through the aligned slats 40 of the vent. The sleeves 11 contact the surfaces of the slats to remove dust and debris, and the tool can be moved along the length of the slats 40 and/or moved upwards or downwards to apply pressure to the surfaces of the slats 40 as the sleeves slide therealong. The sleeves therefore frictionally remove dust and debris via contact therewith. The outer surfaces of the sleeves 11 may therefore be soft, non-scratching and non-marring material such as microfiber or cotton. Alternative materials are contemplated, falling within the scope of the tool structure and operation.

Overall, the present invention provides a detailing tool that can be rapidly deployed and used to clean the delicate and otherwise hard to reach surfaces of a climate control vent. Professional detailers and private individuals alike will appreciate the tool as a simple, inexpensive accessory that can fulfill the given task of interior vent cleaning. For those that desire highly cleanly and very detailed vehicles, the present invention is a welcome and useful addition to the traditional detailing tools for cars and other vehicles.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A handheld detailing tool, comprising:
a handle portion having a gripping area and a base;
a plurality of tines extending from said base, wherein the tines are each separated by a distance from one another;
said plurality of tines comprising elongated members that are substantially parallel to one another;
said base comprising a substantially planar surface and said plurality of tines extending substantially orthogonally therefrom;
a cleaning sleeve disposed over each tine, each cleaning sleeve comprising an elongated member having a square shaped cross section and receiving a tine through an interior channel therein;
wherein the cleaning sleeves are configured to rest flush against each other to form a contiguous surface when secured on the plurality of tines.

2. The handheld detailing tool of claim 1, wherein each of said cleaning sleeves is removably disposed over each tine member receiving a tine through an interior channel therein.

3. The handheld detailing tool of claim 1, wherein:
each of said cleaning sleeves comprises elongated members having a width;
said tines each being separated by a distance from one another;
said width of each cleaning sleeve being equal to at least half the distance between each tine.

4. The handheld detailing tool of claim 1, wherein each of said cleaning sleeves comprises a compressible material and a non-abrasive outer surface suitable for cleaning vehicle surfaces.

5. The handheld detailing tool of claim 4, wherein said non-abrasive outer surface comprises a cotton surface.

6. The handheld detailing tool of claim 4, wherein said non-abrasive outer surface comprises a microfiber surface.

7. The handheld detailing tool of claim 1, wherein said gripping area of said handle portion comprises a depressed area within said handle portion along opposing sides thereof.

8. The handheld detailing tool of claim 1, wherein said handle portion comprises a flat handle.

* * * * *